B. W. FJELLMAN.
BUSHING FOR LOOSE PULLEYS.
APPLICATION FILED MAY 13, 1919.
1,437,969.
Patented Dec. 5, 1922.
2 SHEETS—SHEET 1.
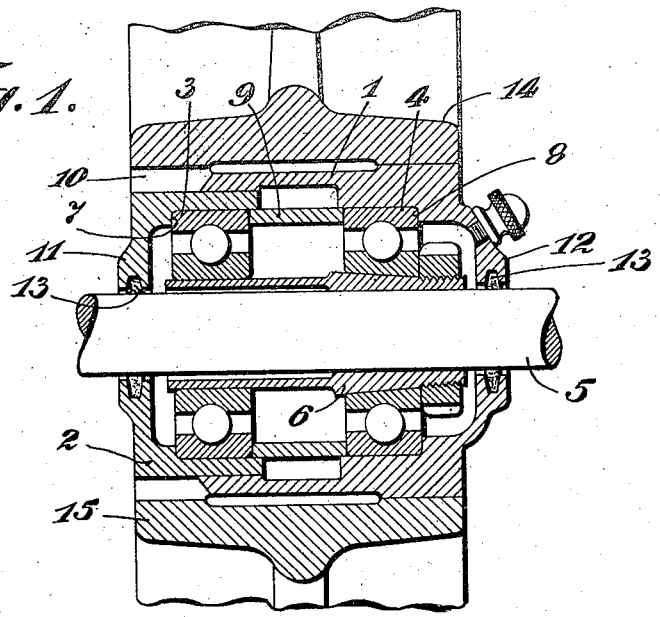
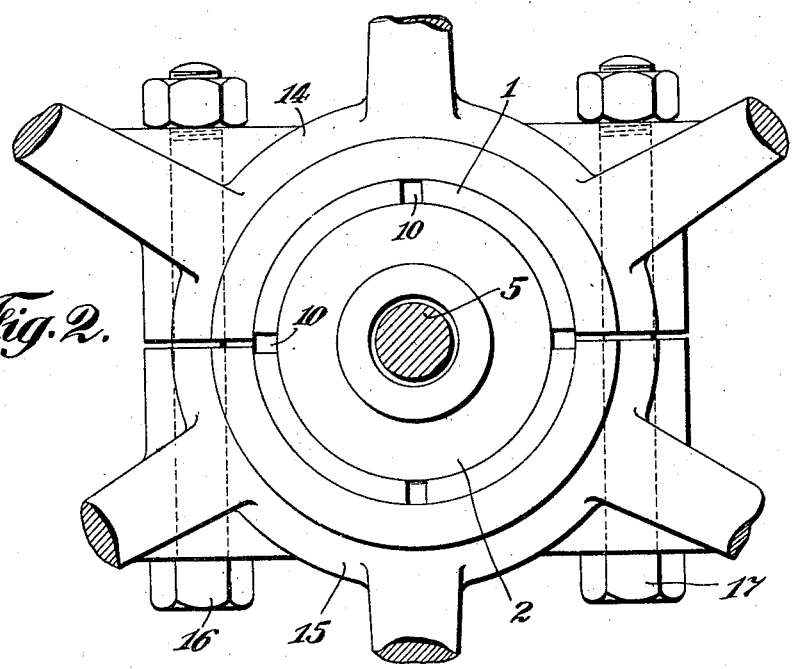
Inventor
Bengt Wiktor Fjellman
By his Attorneys
Fraser, Durk & Myers

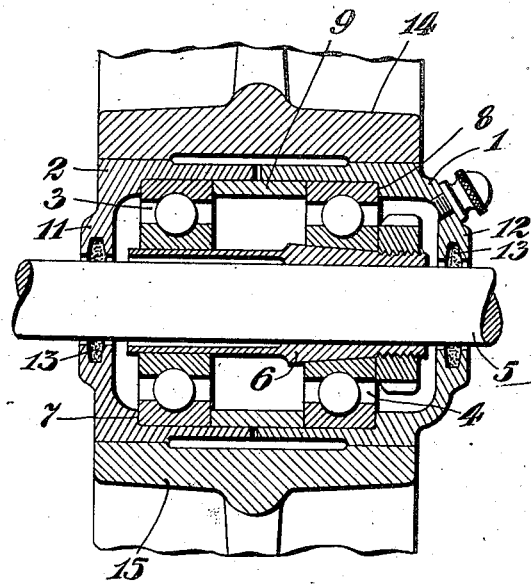
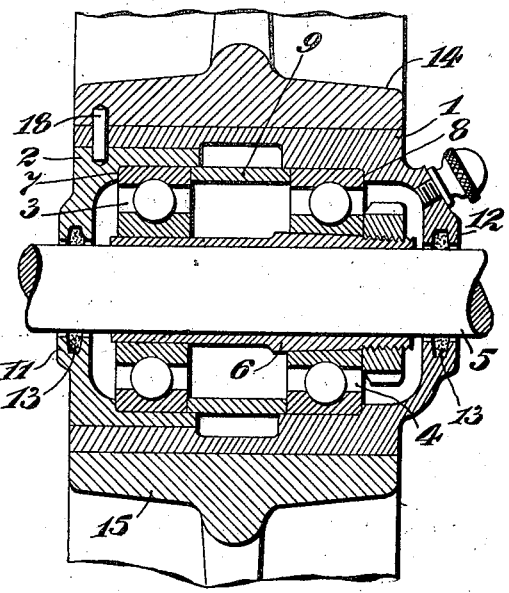
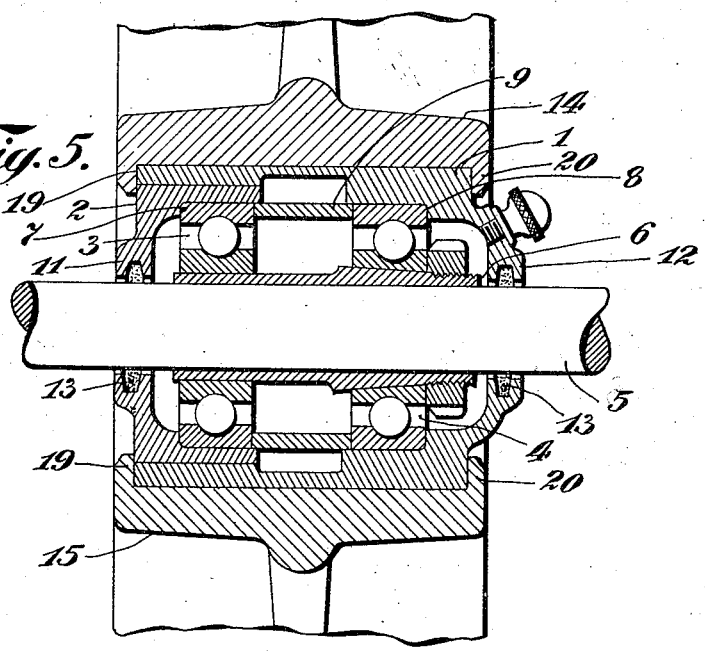

Patented Dec. 5, 1922.

1,437,969

UNITED STATES PATENT OFFICE.

BENGT WIKTOR FJELLMAN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

BUSHING FOR LOOSE PULLEYS.

Application filed May 13, 1919. Serial No. 296,929.

*To all whom it may concern:*

Be it known that I, BENGT WIKTOR FJELLMAN, a subject of the King of Sweden, residing at Gottenborg, in the Kingdom of Sweden, have invented new and useful Improvements in Bushings for Loose Pulleys, of which the following is a specification.

This invention relates to a bushing for split loose pulleys, adapted to be mounted on ball or roller bearings.

An object of the invention is to provide a simple bushing of the said kind which is cheap in manufacture and enables the securing of the ball or roller bearings at the desired distance apart without the aid of expensive screw connections or the like.

Another object of the invention is to provide a bushing of the said kind by means of which the ball and roller bearings may be completely protected from dust and other impurities.

The invention consist, chiefly, in this that the bushing is formed as a housing enclosing the ball or roller bearings and in turn enclosed and held together by the hub of the loose pulley.

In the accompanying drawings some embodiments of a bushing according to this invention are illustrated. Fig. 1 is an axial section of the bushing according to one embodiment with part of the loose pulley shown. Fig. 2 is an end view of said bushing. Figs. 3, 4 and 5 are axial sections of three modified embodiments of the bushing, respectively.

Like references indicate similar parts throughout all of the figures.

With reference to Figs. 1 and 2, the bushing consists of an outer sleeve 1 and an inner sleeve 2 inserted in the outer sleeve at one end thereof. Said sleeves embrace the outer track ring of the ball bearings 3 and 4 centrally mounted upon the shaft 5 by the aid of a clamping sleeve 6. To guide the ball bearings in axial direction provision is made of annular flanges 7 and 8 at the outer ends of the sleeves 1 and 2 said flanges engaging with the outer track rings of the ball bearings. For the same purpose an annular space ring 9 is provided between the said track rings. Formed at the end of the outer sleeve 1 engaging with the sleeve 2 are radially extending slots 10 whereby the compression of the sleeve 1 is facilitated. The ends of the sleeves 1 and 2 directed from each other are formed as covers or shields 11, 12 embracing the shaft 5. Said covers or shields may in well known manner be provided with packing rings 13 bearing against the shaft. After the sleeves 1 and 2 with the ball bearings and the space ring 9 have been mounted upon the shaft 5 in the way illustrated in Fig. 1, the hub halves 14, 15 are placed around the outer sleeve 1 the screw bolts 16, 17 (Fig. 2) being then tightened so as to clamp the sleeve 1 against the sleeve 2 the loose pulley being at the same time secured to the sleeve 1 so that owing to the friction between the parts axial displacement of the parts relatively to each other is prevented.

In the embodiment shown in Fig. 3 any sleeve does not surround the other, as was the case in the bushing shown in Figs. 1 and 2, the sleeves 1 and 2 being in the embodiment shown in Fig. 3 formed substantially symmetrically with their inner end surfaces facing each other. The sleeves are guided, in part by the outer track rings of the ball bearings 3, 4, and in part, by the space ring placed in the sleeves. The parts are held together on account of the friction due to the clamping of the divided loose pulley around the sleeves 1 and 2.

If desired, special means may be provided for preventing axial displacement of the sleeves 1 and 2 in relation to each other, as well as in relation to the loose pulley. Two forms of such devices are shown in Figs. 4 and 5, respectively.

The bushing shown in Fig. 4 is in all essential parts identical with that shown in Figs. 1 and 2 with the exception for the purpose above stated that inserted in the inner sleeve 2 is a pin 18 extending through the outer sleeve 1, and preferably, also entering a corresponding hole formed in the hub.

In the embodiment shown in Fig. 5 the said purpose is attained by the provision at the ends of the hub halves 14, 15 of preferably annular flanges 19, 20, extending beyond the ends of the sleeves, thereby preventing axial displacement of the sleeves relatively to each other as well as relatively to the loose pulley.

Having now particularly described and ascertained the nature of my said invention and in what manner the same is to be performed, I declare that what I claim is:

1. The combination with a divided loose pulley, of roller bearings for carrying said pulley, and a bushing surrounding said bearing and consisting of two sleeves partly inserted in each other and adapted to be held together by pressure from the hub of said divided loose pulley when the halves of the latter are connected with each other.

2. The combination with a divided loose pulley, of roller bearings for carrying said pulley, and a bushing surrounding said bearings and forming a housing therefor, said bushing consisting of two sleeves one within the other, the outer one of said sleeves being split at its one end and adapted to be connected with the inner one by pressure from the hub of the pulley.

3. The combination with a divided loose pulley, of roller bearings for carrying said pulley, and a bushing surrounding said bearings and forming a housing therefor and in turn surrounded by said loose pulley, said bushing consisting of two sleeves one within the other, means being provided for preventing axial displacement of said sleeves in relation to each other.

4. The combination with a divided loose pulley, of roller bearings for carrying said pulley, a bushing between said bearing and said pulley, said bushing consisting of two sleeves in frictional engagement with each other, and a pin for preventing axial displacement of said sleeves in relation to each other.

5. The combination with a divided loose pulley, of roller bearings for carrying said pulley, a bushing between said bearings and said pulley, said bushing consisting of two sleeves one within the other, and a pin extending through the outer one of said sleeves and engaging the inner sleeve and also the hub of the divided loose pulley.

6. The combination with a divided loose pulley, of two roller bearings for carrying said pulley, a space ring between said bearings, and a bushing surrounding said bearings and consisting of two sleeves in frictional engagement with each other and adapted to be pressed against each other by pressure from the hub of the pulley.

7. The combination with a loose pulley of two roller bearings therefor, and two cup-shaped housing members each enclosing one of sand bearings, applied with their open sides facing each other and enclosed within and held together by the hub of the pulley.

8. The combination with a loose pulley of two roller bearings for carrying said pulley, a space ring between said bearings, two cup-shaped housing members enclosing the respective bearings and arranged with their open sides facing each other, and enclosed within and held together by the hub of the pulley.

9. The combination with a divided loose pulley of roller bearings for carrying said pulley, and a bushing surrounding said bearings and consisting of two sleeves adapted to be held together by clamping them between the parts of said divided loose pulley.

In testimony whereof I have signed my name.

BENGT WIKTOR FJELLMAN.